United States Patent

Towson, IV

[11] 4,099,028
[45] Jul. 4, 1978

[54] ASYNCHRONOUS MULTIPLEXER-DEMULTIPLEXER

[75] Inventor: Jacob T. Towson, IV, Goleta, Calif.
[73] Assignee: Hughes Aircraft Company, Culver City, Calif.
[21] Appl. No.: 789,594
[22] Filed: Apr. 21, 1977
[51] Int. Cl.² .............................................. H04J 6/00
[52] U.S. Cl. ............................................. 179/15 BA
[58] Field of Search .......... 179/15 BA, 15 AL, 15 BS

[56] References Cited

U.S. PATENT DOCUMENTS 3,466,397  9/1969  Benowitz et al. ............... 179/15 BA

OTHER PUBLICATIONS

"A Time-Division Multiplexing System for Asynchronous High-Rate Telemetry" by Appel et al., in *APL Technical Digest*, Sep.-Oct. 1971, pp. 2-12.
IBM Technical Disclosure Bulletin, "Asynchronous Multiplex System" by Clark et al., vol. 11, No. 8, Jan. 1968, pp. 910-911.

*Primary Examiner*—Douglas W. Olms
*Attorney, Agent, or Firm*—Don O. Dennison; W. H. Mac Allister

[57] ABSTRACT

An asynchronous multiplexer-demultiplexer for pulse-coded data transmission over a single communication link, such as a laser beam link, at a predetermined transmitter pulse clock rate sufficiently high to accommodate a plurality of source ports and corresponding destination ports wherein each source port includes a plurality of buffer memories for accumulation of data blocks to be transmitted, means for encoding the data source clock rate into a 20-bit word, and means for generating an interrupt signal to the transmitter. A priority interrupt system controls the transmitter to transmit blocks of data from the source ports on a predetermined order of priority giving sources of higher data rate higher priority. Each block of data transmitted is preceded by a header which includes a preamble and block sync codes, a source clock code, a source port identification (ID) code, and a source word length code. The receiver decodes the ID code from the header to enable the source clock code and the word length code for a block of data to be routed to a destination port where that block of data, itself, is stored in the next one of a plurality of buffer memories, and the source clock code is decoded to produce an output clock rate for reading out data from the buffer memories of the destination port on a first in, first out basis. The word length code is employed by the destination port if necessary, for converting data from serial to parallel form.

10 Claims, 9 Drawing Figures

Fig. 3a. Pattern of Repeatability

ASYNCHRONOUS MULTIPLEXER-DEMULTIPLEXER

BACKGROUND OF THE INVENTION

This invention relates to an asynchronous multiplexer-demultiplexer for transmitting pulse code modulated (PCM) data over a communication link, and more particularly to a system for telemetering over a communication link using asynchronous multiplexers and demultiplexers.

Most telemetric systems now use digital techniques for data transmission. Since sampling and converting the sample to an n-bit word may be completely asynchronous, a system capable of accepting a plurality of completely asynchronous sources is required. It is recognized that once the data from a source has been converted to digital form, it is synchronous with a data clock provided for that source. The problem then is to encode the data clock of each source at the input to the transmitter and reconstruct the data clock at the output of the receiver. In the case of multiple sources, the system must be able to transmit multiple asynchronous inputs, and their respective clocks, and somehow multiplex them to provide a single transmission over one communication link, such as a laser beam.

In previous telemetric systems, time-division multiplexing has been provided with fixed sequencing for a number of data sources operating at different data clock rates. The sequencing was artificially designed into the system by calculating the position, and the percentage of time, that each source must have in the transmitted stream of data. The problem with such a fixed sequencing scheme is that data from the sources must be coordinated so that each source will have its data ready for transmission when its slot occurs. Either the data sources are synchronous, or their data is converted to a synchronous form. The problem with such a technique is that the time slot for each block of data transmitted for each source must be calculated for every specific input frequency and therefore limits the system's flexibility in accepting new or difficult data inputs. The need is for a system with greater flexibility in accepting a large variation in data clock rates without redesign, i.e., a generalized multiplexing scheme that does not have to be designed to a specific configuration of data input rates.

SUMMARY OF THE INVENTION

In accordance with the present invention, an asynchronous communications system having a time division multiplexer at the transmitter and a time division demultiplexer at the receiver is provided with means for encoding the clock rate of data to be transmitted at respective input ports so that the receiver can reconstruct the data clock accurately at the output ports of the demultiplexer for the data pulses from the separate sources. A block of data from each source is preceded by a header comprised of an identification code and a data clock rate code. The latter is generated by a counter that counts transmitter clock pulses, $F_{TX}$, during the period $AT_n$ required to accumulate a block of A bits (such as 2048 bits) from a source at a rate $F_n$, where $T_n = 1/F_n$. In order for the transmitter to be able to transmit data at a rate independent of the source, and to begin a transmit cycle at any point in a subsequent source data input cycle, input buffer memories are provided at each source port to accumulate data in blocks of A bits, and to generate a priority interrupt signal, as each of a plurality of buffer memories is filled in rotation. The priority interrupt signals from all of the sources are serviced on a predetermined priority basis which gives higher priority to sources of higher clock rates. As a source interrupt is serviced, a block of A bits from one of its buffer memories selected in rotation is transmitted at a fixed transmission frequency $F_{TX}$ selected to be greater than the sum of all source frequencies $F_n$ by an efficiency factor E to allow for the fact that each block of a predetermined number of A bits transmitted is preceded by an ID code, a source clock rate code, a word length code, a preamble and a sync code. This priority interrupt system assures that all source ports will have enough time to output their data a necessary number of times before the source port having the slowest data input rate generates successive interrupt signals, provided only that the transmission frequency is calculated to be $$F_{TX} = \frac{1}{E} \sum_{n=1}^{k} F_n$$

where k is the number of input source ports. In the transmission cycle defined by the block accumulation rate of the slowest source, each of the other sources may repeat transmission cycles asynchronously at a rate determined by its input clock rate. In other words data from the sources are asynchronously stored in input buffer memories of separate source ports, and at their own output clock rate. As each block of data from a source is stored, an interrupt signal is generated and stored in the transmitter which reads out buffer memories of the ports for transmission in a priority sequence predetermined on the basis of the input clock rates of the sources. An adaptive time division multiplexing system is thus provided which assures every source an adequate number of spaced time slots for transmission. The receiver decodes the ID code and routes the clock code, word length code and the transmitted data to respective output ports, each of which includes output buffer memories filled at the transmitter clock rate, $F_{TX}$, and emptied at the slower rate, $F_n$, by a clock generated from the clock code.

Encoding the data clock rate of a source is accomplished by counting the transmitter clock, $F_{TX}$, and sampling the count after a block of A data bits has been accumulated at the clock rate $F_n$ of the data source. Each time an interrupt signal is generated, that count is stored in a header for transmission with the block of data just accumulated. At the same time that the count is stored in the header, the counter is cleared to begin counting the transmitter clock again for the next block of data from the same source. The transmitter clock is replicated by a bit synchronizer in the receiver as a clock $F_{RX} = F_{TX}$, and is used to generate an output data clock equal to the source data clock $F_n$ from the relationship CLOCK CODE = $(AT_n)F_{RX}$.

Since both A and $F_{RX}$ are known, it is possible to compute $T_n$ and produce an output data clock at a rate $F_n = 1/T_n$, but it is preferable to generate the output data clock by entering only the most significant bits into a count down register as necessary to divide the clock code by 2A, and counting down that register to zero by $F_{RX}$. The zero state is sensed to toggle a flip-flop and reload the register. The result is a signal of frequency $2F_n$ triggering the flip-flop, and the desired clock of frequency $F_n$ at the output of the flip-flop. The remainder of the clock code not entered in the count down register (the least significant bits of the code) are added to the content of an accumulator register each time the count down register is loaded, and any carry produced by this addition adds a binary 1 to the most significant bits entered into the count down register for the next count down cycle in order to maintain an average frequency at the output of the flip-flop that is more precisely equal to $F_n$ over several count down cycles.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
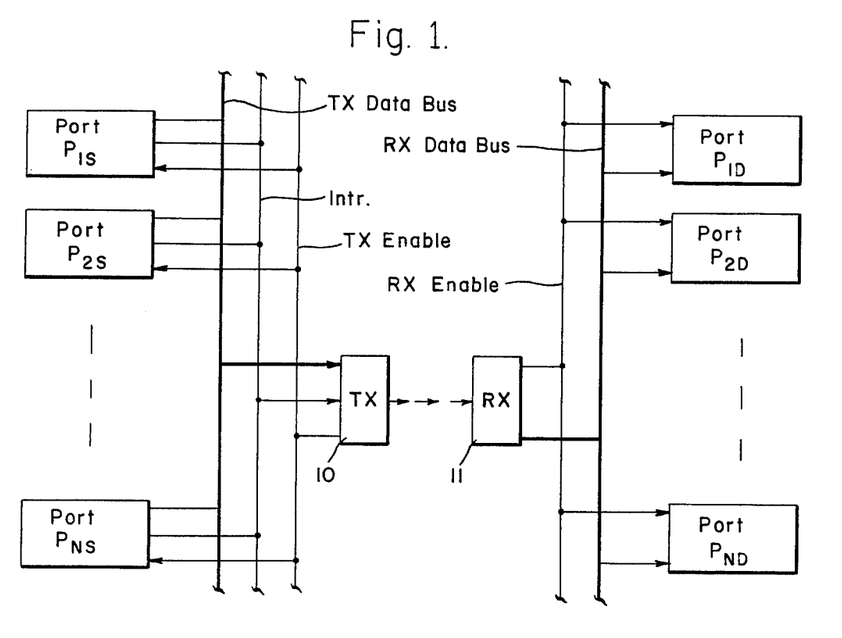
FIG. 1 is a general block diagram of a time-division multiplex transmission system using a laser link and a priority interrupt scheme for asynchronous data sources.

Referring now to FIG. 1 of the drawings, a laser transmitter 10 and receiver 11 provide a single communication channel between a plurality of ports $P_{1S}$, $P_{2S}$, . . . $P_{NS}$ and a plurality of corresponding ports $P_{1D}$, $P_{2D}$, . . . $P_{ND}$ in order to transmit pulse-coded data from completely asynchronous sources (not shown). Each source connected to one of the source ports provides data to be transmitted that is either already in digital form at some data pulse (clock) rate or is converted into digital form at the input to the port at a pulse rate independent of any other source of data. The transmitter is thus presented with asynchronous data at different rates for multiplexing into the laser channel at a high transmitting pulse rate $F_{TX}$. The receiver demultiplexes the data to the corresponding destination ports where the rates of the data thus received are converted to the rates, $F_n$, of the corresponding source ports.

It should be noted that while the preferred embodiment employs a laser beam for high data transmission to preclude the necessity of using solid conductors as carriers, it would be feasible to use a microwave beam, or in some cases a cable conductor. However, a microwave beam may not be usable in some communities already overcrowded in the various frequency bands, and in some cases it may not be possible to lay a cable because of environmental conditions, mobility of the transmitter and/or receiver, or prohibitive costs.

As each digital source may produce data to be transmitted that bear no relation to the data from any other source, either in word length (bits per word), or frequency (bits per unit time), the transmitter must be capable of transmitting data from completely asynchronous sources. This is particularly true in telemetry systems of analog signals that bear no resemblance to one another in either frequency or amplitude. Some signals will require more frequent sampling than others, and some signals will require conversion to more discrete levels than others, i.e., to longer digital words. Consequently, as will be described more fully hereinafter, the data to be transmitted from a source through a particular port is accumulated in blocks of uniform bit length at a clock rate determined by the source and transmitted at a clock rate selected to be sufficiently high to assure multiplexed transmission of all blocks from all sources as data from the various sources are asynchronously accumulated into blocks. Before proceeding with a more detailed description of how such a transmission rate can be selected, an exemplary format for the data transmitted will be described with reference to FIG. 2.

Figure 2:
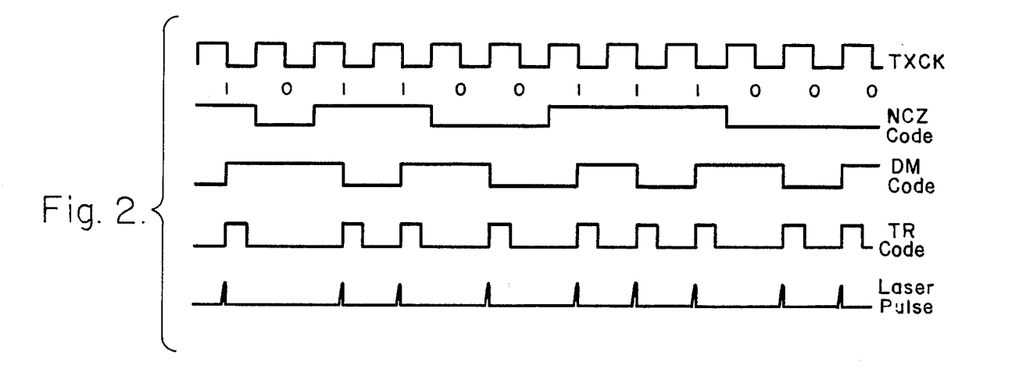
FIG. 2 is a timing diagram illustrating conversion from NRZ to DM code and generation of laser pulses in the transmission system of FIG. 1.

The most common data format is a nonreturn-to-zero (NRZ) code for representation of a train of binary digits to be transmitted at a frequency $F_{TX}$ of clock pulses TXCK. As shown in the first two waveforms of FIG. 2, the waveform for the NRZ code changes to an appropriate high or low level at the leading edge of a clock pulse, depending upon whether the bit being clocked is a binary 1 or 0. One problem with transmission of such a waveform is its high spectral density. To avoid having to transmit a signal of such high spectral density, it is common practice to convert the signal to a delay modulation (DM) code, sometimes known as the Miller code, shown in the third waveform. A transition (TR) code is then generated by generating a pulse at transition of the DM code from a low level to a high level, and from a high level to a low level. The TR code pulses are thus synchronized with the transmitting clock TXCK, as shown in FIG. 2. Each TR code pulse is then used to trigger a laser pulse which will have well defined leading edges coincident with the transitions of the DM code, as shown in FIG. 2. The DM code may thus be readily reconstructed by the receiver.

At the receiver, a timing signal is extracted from the reconstructed DM code for use not only in translating the DM code back into the NRZ code by a decoder in the receiver, but also for use as a receiver clock RXCK within the receiver. That clock is used for timing the detection and the decoding of a header appended to each block of data transmitted from a source. The header in a preferred embodiment is 64 bits long and includes a preamble code (24 bits), a sync code (7 bits), a word length code (6 bits), a port identification (ID) code (7 bits), and a clock code (20 bits). The clock code is used by the destination port to generate from the receiver clock RXCK an output clock OBCK which is synchronous with the decoded data and at a rate equal to the input data clock rate of the data into the corresponding source port. Thus, the source port encodes the rate of an input clock IBCK into a 20-bit clock code which is transmitted in the header of the block of data transmitted from that source port to a corresponding destination port. The distinction port then decodes the 20-bit clock code and generates an output clock OBCK that is at the frequency of the input clock IBCK and is synchronized with the receiver clock RXCK (equal to the transmitter clock TXCK) extracted from the transmitted signal as noted above.

From the foregoing general discussion it may be readily appreciated that in accordance with the present invention, data from any one of a number of sources at independent clock rates entered into a source port is transmitted at a clock rate TXCK selected to be sufficiently high to permit time division multiplexing for transmission of data from all sources operating asynchronously to separate destination ports which deliver the received data to utilization devices (not shown) operating at lower clock rates equal to the clock rates of data into the respective source ports.

In a preferred embodiment shown in block diagram in FIG. 1, there is one 37-wire data bus, TX DATA BUS, interconnecting all of the source ports $P_{1S}$ through $P_{NS}$ to the transmitter and two N-wire buses, an interrupt bus, INTR, having a separate wire for connecting each source port to the transmitter for interrupt signals, and a transmit enable bus, TX ENABLE, connecting the transmitter to each source port over a distinct wire for enable signals.

As will be described more fully hereinafter, each source port will accumulate a block of data from an independent source (not shown) at a clock rate IBCK, and transmit an interrupt signal to the transmitter when the block of data has been accumulated. Later the block of data is transmitted at a rate $F_{TX}$ of transmit clock pulses TXCK. Once the transmitter recognizes the interrupt signal, an enable signal is transmitted by the transmitter to the source port to commence transfer of the block of data to the transmitter for transmission. The block of data includes a header, as noted above, comprising an identification (ID) code decoded by the receiver 11 to enable a corresponding destination port over one N-wire bus, RX ENABLE, to receive the transmitted block of data. The enabled destination port is coupled to the receiver through a 37-wire data bus, RX DATA BUS. This system may be used for high volume data transmission, such as in telemetering oil field data to various monitoring and control equipments at a remote location, preferably over a laser beam link, although in some cases a microwave link or telephone cable may be used.

When a laser beam link is used, a code converter must be employed to convert the NRZ code into one that is compatible with the laser transmission medium. The laser code must be self-clocking, i.e., the clock of the laser code must be derivable from it at the receiver. This requirement eliminates from consideration any code in which a bit 1 would be represented by a pulse and a bit 0 by the absence of a pulse (as in the NRZ code) since unpredictable long strings of "0's" or "1's" would then not transmit clock information to the decoder. The code must also require a minimum number of laser pulses to transmit a binary digit of information. Since at present the maximum number of laser pulses that can be transmitted per second is limited to 1MHz, information flow can be maximized by use of an efficient code. The DM code described above is one such efficient code.

The DM encoding algorithm for data in the NRZ code is to provide a transition at the center of a bit period representing a binary 1, a transition at the end of a bit period between successive periods representing a binary 0, and to have no transition closer than one transmitter clock period (bit period) to another transition. The laser pulse may thus be timed as described hereinbefore with reference to FIG. 2.

The received laser pulses are employed to reconstruct the DM code and to extract a timing signal used to decode the DM code, i.e., to convert the DM code back to the NRZ code. The decoding takes place at the input of the receiver 11. Since use of the DM code is recommended only to accommodate laser pulse transmission, the DM encoding and decoding scheme does not, per se, constitute a part of this invention. For example, in the case of a microwave link, or telephone cable, the NRZ code may be transmitted by direct frequency or phase modulation of a carrier. What this invention is directed to is an information transmission system capable of accepting digital information from completely asynchronous sources for time division multiplexing, transmission and demultiplexing without the necessity to design the system for specific bit rate input at the input ports. Another feature is the capability of transmitting all data with information about the clock pulse of the source in order to provide demultiplexed output data to a utilization device at the same rate as the input.

The following is a discussion of the theoretical basis for the information transmission system disclosed which shows it is possible for the system to accept completely asynchronous sources (variable in number from 1 to N) for time division multiplexing with assurance that all sources will be able to have their data transmitted over a single, serial transmission path and route them at the receiver of the system to their respective destinations (destination ports) as needed without a preassigned time slot for each source in the multiplexing scheme, and to also transmit information for reconstruction of their respective clock pulses as needed.

Where the data sources present data words for transmission in parallel, instead of in series, a parallel-to-serial converter may be employed to couple the source to the source port, preferably one designed to be set in the field for a word length of 2 to 32 bits in order to provide maximum flexibility in interchanging source devices. A serial-to-parallel converter at the output of a destination port is similarly designed to be set to a corresponding word length.

It should be noted that the ports are limited in transmission frequency to data clock rates, $F_{TX}$, of 2 MHz, or possibly higher, e.g., 4 MHz, by the basic frequency response of components in the ports. Due to the scheme of input data clock encoding to be described, the ports have a lower limit on the transmission frequency which is proportional to the transmission frequency by the formula $F_{n\,low} = [30.52 \times 10^{-6}]F_{TX}$. Thus, at an $F_{TX}$ of 1 MHz, the lower frequency limit of a port is 30.52 Hz, and at an $F_{TX}$ of 500 Hz, the lower limit drops to 15.26 Hz. Another limitation of the system frequency is that the sum of all port input frequencies, $F_n$, cannot exceed the frequency of transmission, $F_{TX}$, multiplied by an efficiency factor, $E$.

The efficiency factor accounts for the fact that a header must be transmitted with each block of data. An efficiency factor of 0.9667 has been achieved in the present invention with a transmission frequency $F_{TX}=1$ MHz and a 64 bit header for the following information: 7-bit ID code, 20-bit clock code, 6-bit BCD word length, 7-bit sync code, and a 24-bit preamble. The last two items of information are useful in order to reacquire the data stream after a loss of receiver synchronization for whatever reason, such as momentary occlusion of the transmission channel (laser beam path). In a full duplex system, the data source supplying the information would have to resupply only those specific destination ports reporting missing data.

To have an extremely high probability of block or frame acquisition, or conversely, an extremely low probability of false block acquisition out of random data, 30 bits of known encoding is sufficient, but at least one bit of dropout should be allowed within this code even with the low bit loss probability of a laser link. Therefore, a 64 bit header is employed having a 31-bit block acquisition code and 33 bits of "housekeeping" data for a port. To obtain a high efficiency factor of 0.9667 with this length of a preamble, it is necessary to include 2048 bits of actual data from a port with every block transmission. In the actual design, seven bit times of delay between transmissions are provided for timing consideration, giving an overall efficiency factor of 0.9665. Since the total output time would be completely filled with this efficiency, an actual efficiency factor of only 0.9660 is used for the calculation of the transmission frequency $F_{TX}$ according to the equation.

$$F_{TX} = \frac{1}{E} \sum_{n=1}^{k} F_n. \quad (1)$$

Since the transmission of a block of data from any source at a slower speed than that of transmission can occur at any point in the following input data time cycle of that port, a buffer memory of 6144 bits is provided in each port to effect a system having no possibility of completely filling the buffer for any source before data from the source is transmitted.

If there is a constant amount (A) of input data accumulated in each port, and there is a constant rate ($F_{TX}$) of retrieving this data for inclusion in the output data stream, then the time taken to access or transmit each port's data is a constant (A/$F_{TX}$). Assuming the input bit rate ($F_n$) to be consistent over time, the time taken to store the constant amount of data is the constant (A/$F_n$). The time to read out all of the N ports of data is calculable as AN/$F_{TX}$. The percentage of output time versus input time for a given port (n) is then A/$F_{TX}$ ÷ A/Fn = $Fn/F_{TX}$ and the constant amount of data (2048 bits) is irrelevant to this proportion.

If one uses Equation (1) for calculating $F_{TX}$, and assumes $E = 100\%$, the description of the percentage of output time versus input time for all ports is found to be $$F_{TX} = F_1 + F_2 + F_3 + F_4 \ldots + F_N. \quad (2)$$

Dividing through by $F_{TX}$, $$1 = F_1/F_{TX} + F_2/F_{TX} + F_3/F_{TX} + F_4/F_{TX} + \ldots + F_N/F_{TX} \quad (3)$$

it is evident that the sum of all the ratios of the input times to the output times for all ports is equal to 1. If $F_{TX}$ were to be increased slightly, the right hand side of Equation (3) would equal something less than 1,e.g., 0.9660. This statement of Equation (3) proves that, given a certain $F_{TX}$ as calculated in Equation (2), all the ports will have enough time to output their data before the next total input group is ready to be transmitted, i.e., there is a time slot in the output of data for all ports to read out their buffers. But in a completely asynchronous system, some ports will obviously fill their data buffers faster than other ports, and will therefore require more accesses to the data transmitter.

In previous systems, sequencing was predetermined and designed into the system by calculating the position and the percentage of time that each port must occupy in the output stream, and developing an access sequence that gives as close to this predetermined position and percentage as possible. This sequencing is now obtainable by the present invention without elaborate and fixed sequencing networks. The sequencing required is dependent only upon how fast the ports fill their respective buffers, so that as the source ports generate an interrupt signal when each one of their buffers is filled, the frequency of occurrence of these interrupts will be identical in frequency with the desired port access to the transmitter. If these interrupts are then employed in a priority interrupt system, the faster port can be answered prior to the slower port interrupts. A system based on a priority interrupt technique is thus evolved that needs no predetermined and fixed sequencing structure and can therefore be of a completely general design accommodating any group of asynchronous inputs without specific sequencing circuitry peculiar to any one application or installation. This would considerably lower the cost of such a system. The only criterion of such a system would be that every port have access to the output data stream upon filling a buffer prior to the filling of an alternate buffer. To "have access" simply means that an interrupt signal, which has attained highest priority (after all higher priority interrupts have been answered) is serviced before any lesser priority interrupt signal. Meantime, the port having access may start to fill its alternate buffer.

The time it takes for a port to fill a buffer memory of 2048 bits is, of course, proportonal to its input frequency ($F_n$). Since all port buffers are of the same size (2048 bits), one may speak only of the time it takes the ports to input one bit of information ($T_n = 1/F_n$). The time to output a full buffer into the output data stream is proportional to the transmitter frequency ($F_{TX}$), and since all ports output identical amounts of data (2048 bits) per interrupt, one may speak only of the time, $T_x$, it takes the ports to output one bit of information where $T_x = 1/F_{TX}$.

Since all full buffers must be accessed during the time it takes for their individual ports to input information into an alternate buffer, lest the input data rates exceed the output data rates and the buffers be overloaded, it would be convenient to speak of an output time sequence (OTS) equal to the time it takes the slowest input ports to fill a buffer (or generate one interrupt). Assuming a series of ports $P_{1S}$, $P_{2S}$, $P_{3S}$, ... $P_{iS}$ ... $P_{NS}$, all having different input frequencies $F_1$, $F_2$, $F_3$ ... $F_i$ ... $F_N$, therefore different input bit times: $T_1$, $T_2$, $T_3$ ... $T_i$ ... $T_N$, such that the output time sequence (OTS) may contain 100% of the data input during the OTS, there must be one $T_x$ for every interrupt occurring starting at least within the following $T_i$ time of a given port ($P_{iS}$) generating the interrupt, to prevent that port from overfilling its buffer. Since the slowest port requires only one $T_x$ during the OTS (by definition) all higher priority ports can have their input times normalized to the OTS by dividing by $T_N$. Conversely, since $F_N$ produces only one interrupt during the OTS (by definition) the other ports will produce $F_i/F_N$ interrupts, evenly spaced during the OTS. This ratio simply describes how much faster a given port ($P_{iS}$) inputs information compared to the slowest port ($P_{NS}$).

The following discussion concerns only the time taken to input or output one bit of information. Assume a series of ports ($P_{1S}-P_{6S}$) having input frequencies: $F_1=333.3$ KHz, $F_2=200$ KHz, $F_3=166.7$ KHz, $F_4=150$ KHz, $F_5=100$ KHz, $F_6=50$ KHz. Then $F_{TX}=1000$ KHz, and a corresponding series of input bit times is: $T_1=3$ μsec, $T_2=5$ μsec, $T_3=6$ μsec, $T_4=6.67$ μsec, $T_5=10$ μsec and $T_6=20$ μsec. The OTS is then 20 μsec and $T_X=1$ μsec. The normalized interrupts are calculated $F_1/F_6=6.667$, $F_2/F_6=4$, $F_3/F_6=3.335$, $F_4/F_6=3$, $F_5/F_6=2$, $F_6/F_6=1$. Summing the number of interrupts in one OTS, there are $6.667 + 4 + 3.333 + 3 + 2 + 1 = 20$ interrupts occurring during the OTS, each taking $T_X$(1 μsec) to be answered. Therefore all interrupts may be answered during the OTS as a direct result of the calculation of $F_{TX}$.

The priority scheme demands that each port interrupt be answered during the following input time ($T_i$) of that port. Assuming the "worst case" conditions, namely that all ports interrupt at one time (i.e., that all simultaneously desire output to the output data stream), $P_{1S}$ obtains output immediately taking an output bit time ($T_X$) of 1 μsec. $P_{2S}$ is accessed next, taking 1 μsec to output. $P_{3S}$ is next in line and obtains 1 μsec for its output. Now $T_1=3$ μsec, and 3 μsec have just been used, but if $T_X$ is a shade under 1 μsec, say 0.99999 μsec, only 2.99997 μsec have now been used and $P_{4S}$ may obtain access before $P_{1S}$ interrupts again. $P_{4S}$ takes 1 μsec to output its data and during that time, $P_{1S}$ has interrupted again so, having highest priority, it must gain and output again for 1 μsec. We are now 0.99999 μsec × 5 = 4.99995 μsec into the OTS, so before $P_{2S}$ interrupts again at 5 μsec ($T_2$) into the cycle, $P_{5S}$ may gain access to the output data stream for 1 (or 0.99999) μsec.

Figure 3:
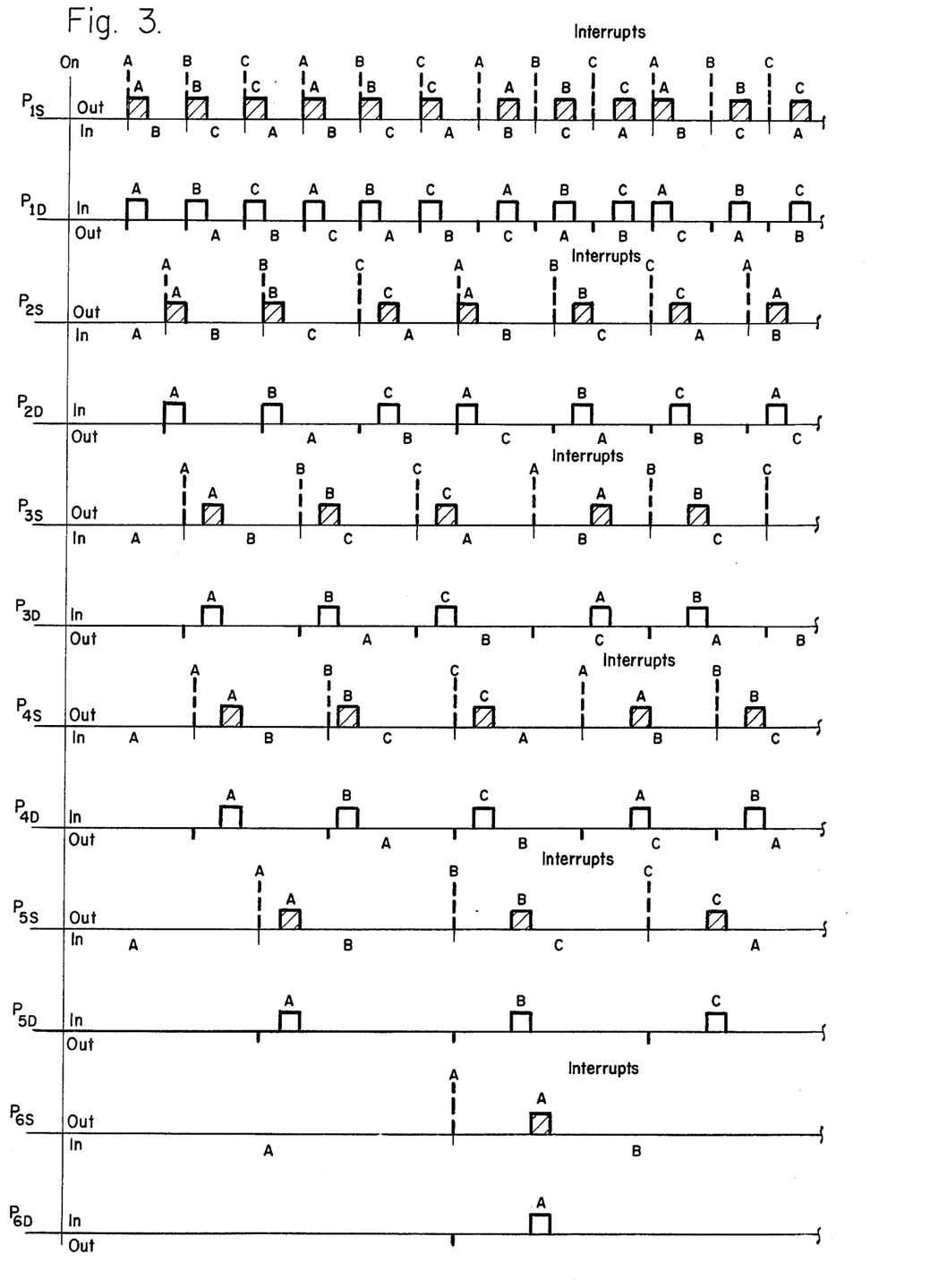
FIGS. 3 and 3a, taken together, is a timing diagram illustrating time-division multiplexing of six asynchronous sources.
Figure 3A:
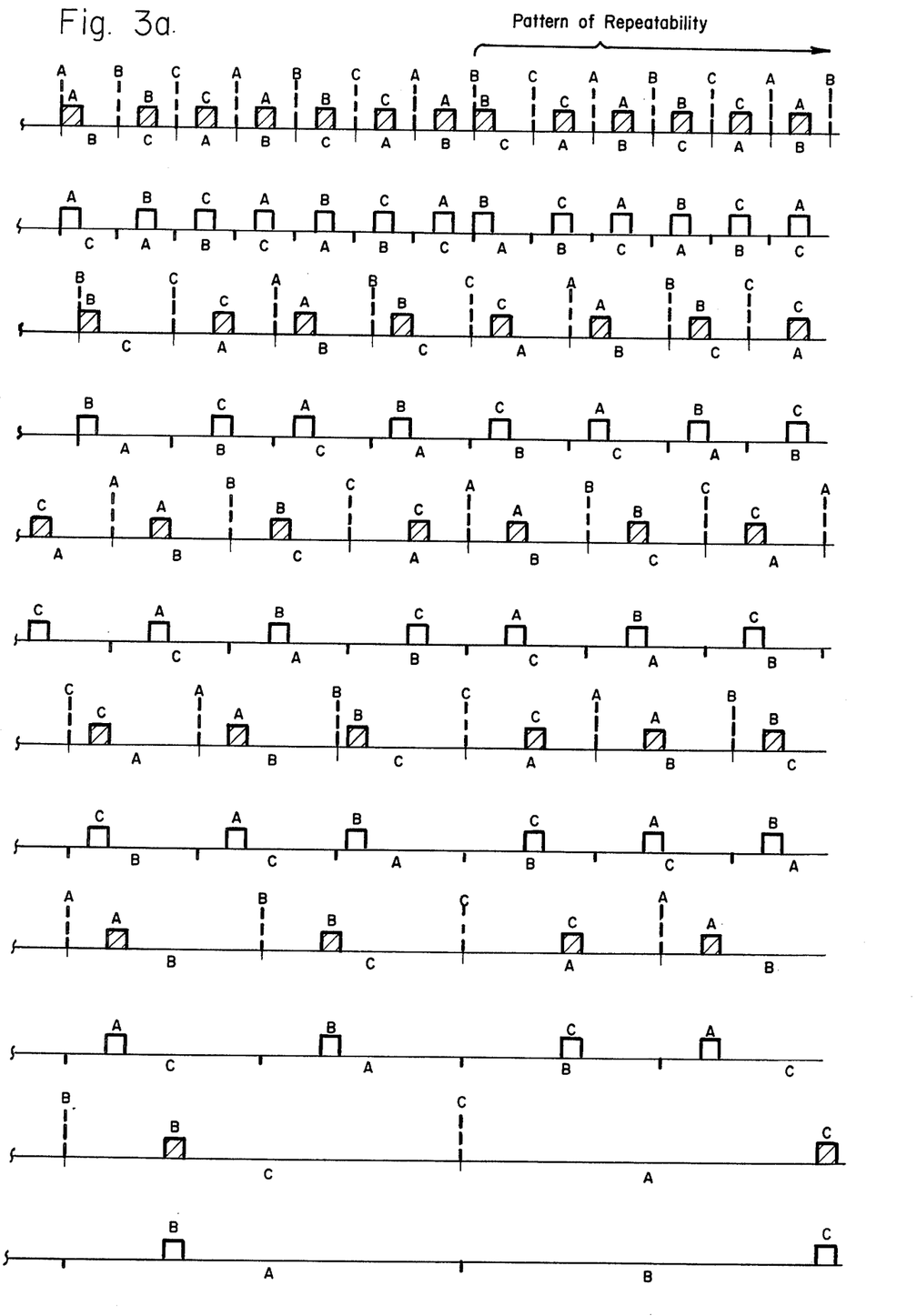

The above sequence and subsequent steps are shown diagramatically in FIGS. 3 and 3a which demonstrates that all interrupts are answered for this example of six ports during the following $T_i$ of a given port. All interrupts are assumed to occur simultaneously at the beginning of the sequence designated "pattern of repeatability" so that the discussion above may be followed with the help of this diagram. Ports 1–6 are ranked in order of priority which is also the order of descending input frequency. The vertical markings on the output time line, $T_X$, of a specific port are the interrupts and occur every $T_i$ time for that port (port 1 every 3 μsec, port 2 every 5 μsec, etc.). The shaded squares represent buffer outputs (one square/output). From the above discussion and example, it is evident that a port located in the priority sequence must wait for a length of time less than or equal to the number of interrupts occurring above it in the priority chain times the output time, $T_X$, for each port of higher priority plus whatever time remains for completing transmission of any block currently being transmitted.

In a two buffer port, the port mentioned above must also wait until its full buffer is emptied (an additional $T_X$) before the next interrupt is generated at a time $T_i$ from the previous interrupt. Otherwise, input data will automatically switch input buffers before the already full buffer is completely unloaded. That is, a buffer will be loaded and unloaded simultaneously. If a third buffer is added to the memory bank in each port, the port interrupt may be answered just prior to the following interrupt occurring at a time $T_i$ from the previous interrupt. This allows the first buffer to be read out during the time the second buffer becomes completely filled because the third buffer is free to accept input data when the second interrupt (second buffer full) occurs. This scheme allows the output from the first interrupt of the port to occur during a part of the second $T_i$ time of that port following the first interrupt. That is, the first time $T_X$ may overlap the second interrupt. This means that the time $T_i$ of any port must be greater than the number of interrupts from higher priority ports times the transmission time $T_X$ plus the time $<T_X$ it takes for a previously acknowledged lower priority port to finish its data output.

In the example, the number of interrupts occurring during the time $T_N$ of the lowest priority port is calculable on the average to be $(F_1 + F_2 + F_3 + \ldots F_N) \div F_N$. The number of higher priority interrupts occurring during any $T_i$ time may be found by normalizing all higher priority (higher frequency) ports to that particular $T_i$ time. The higher priority interrupts are the only interrupts that will block the output of a given port. The output time $T_X$ of a buffer is identical for all ports and is calculable from the formula:

$$F_{TX} = \sum_{n=1}^{k} F_n \text{ (assuming } E=1 \text{ for convenience).}$$

$$F_{TX} = F_1+F_2+F_3 \ldots F_{i-1}+F_i+F_{i+1}+ \ldots +F_k$$

or, in the time domain:

$$1/T_X = 1/T_1 + 1/T_2 + 1/T_3 + \ldots + 1/T_{i-1} + 1/T_i + 1/T_{i+1} + \ldots + 1/T_k$$

The number of higher priority interrupts occurring during the $T_i$ time of any general port ($P_i$) is:

$$\frac{F_1}{F_i} + \frac{F_2}{F_i} + \frac{F_3}{F_i} + \ldots \frac{F_{i-1}}{F_i}$$

or, in the time domain:

$$\frac{T_i}{T_1} + \frac{T_i}{T_2} + \frac{T_i}{T_3} + \ldots + \frac{T_i}{T_{i-1}}$$

Our criterion for the operation of a given port ($P_i$) is that any interrupt issued must be acknowledged (buffer access begun) during the following $T_i$ time of that port. This means that the $T_i$ time must be incrementally larger than the higher priority interrupts occurring during this time multiplied times the time taken to output the higher priority data plus the time taken to output the data from a previously acknowledged lower priority interrupt. This means that the lowest priority port must fully output its buffer from one interrupt before the next interrupt occurs.

Since $F_{TX}$ can be set to be equal to at least the sum of the different input frequencies, there is assurance of any and all interrupts of a given port $P_{iS}$ being acknowledged during the following $T_i$ time of that port. The system is thus free of any artificial constraints upon system timing and operations such as the fixed sequencing networks heretofore have had in the design of asynchronous input systems. For the lowest priority port, there is assurance that it may fully output its buffer from one interrupt to the next, but since there may be a large fraction of a period $T_i$ before its interrupt is acknowledged, but not more than the period $T_i$, there is assurance that while one buffer is outputting, new data being accumulated will not exceed the total capacity of the second and third buffers of a triple buffer memory. In the case of the highest priority port, its interrupt has to wait to be answered only the time it takes to output a previously interrupting lower priority port, which is $T_X$ or 1 μsec. This fact is demonstrated by a scientific case.

Assume two ports ($P_{1S}$ and $P_{2S}$), with $F_1 = 800$ KHz and $F_2 = 200$ KHz, i.e., $T_1 = 1.25$ μsec and $T_2 = 5$ μsec. $F_{TX} = F_1 + F_2 = 1000$ KHz and $T_X = 1$ μsec. Assume further that both ports interrupt simultaneously (worst case) and desire output to the telemetry stream. The OTS in this case is 5 μsec and, during that time $$\frac{T_2}{T_1} = \frac{5 \, \mu\text{sec}}{1.25 \, \mu\text{sec}} = 4$$

interrupts from $P_{1S}$ occur during the OTS. In the case of the last priority port ($P_{2S}$), $T_2$ is calculated as:

$$T_2 = T_2/T_1 \, T_X + T_X = 5T_X = 5(1 \, \mu\text{sec}) = 5 \, \mu\text{sec}.$$

Figure 4:
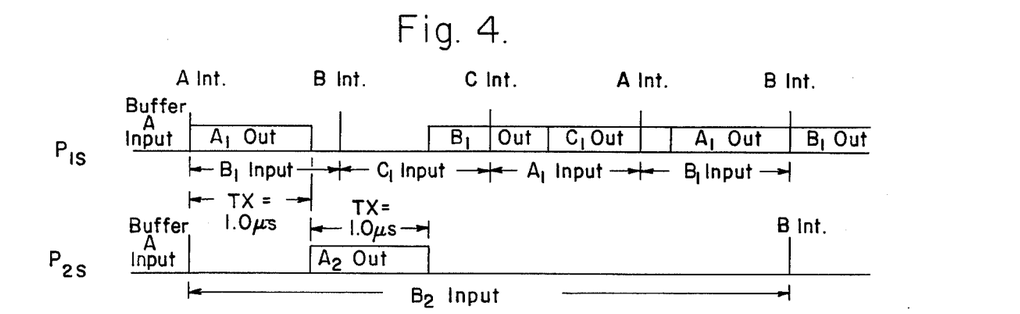
FIG. 4 is a timing diagram illustrating the manner in which the present invention outputs buffered data for a special case of two source ports operating at different data rates.

A schematic representation of this special case is shown in FIG. 4. It is assumed that buffer A in both ports has been previously filled, and both ports generate buffer A interrupts simultaneously. Port $P_{1S}$ being higher in priority, it is answered first and buffer $A_1$ is read out for transmission while buffer $B_1$ is being filled. Since $T_1 > T_X$, buffer $A_1$ finishes its output before buffer $B_1$ is filled and generates an interrupt ($B_1$INT). During this time that buffer $B_1$ is being filled, the previously occurring interrupt $A_2$INT of buffer $A_2$ is read out for transmission. During the time $T_X$ of buffer $A_2$, buffer $B_1$ is filled and the interrupt $B_1$INT is generated, but this interrupt is not acknowledged until the previously interrupting lower priority port ($P_{2S}$) has finished reading out its buffer $A_2$. Upon port $P_{2S}$ completing its output, interrupt $B_1$INT is acknowledged and port $P_{1S}$ begins the output of its buffer $B_1$. At this time, port $P_{1S}$ is filling its buffer $C_1$ and, as shown in FIG. 4, it is filled before buffer $B_1$ finishes its output. If there were only two buffers (A and B) per port, the input during the time $T_1$ from interrupt $B_1$INT would have gone back into the previously emptied buffer $A_1$. Buffer $A_1$ would then have been filled during the output of buffer $A_2$ and part of the output of buffer $B_1$. If buffer $A_1$ is filled during the output of buffer $B_1$, then the input information would have no place to go but buffer $B_1$, and that would require an input/output operation in the same buffer. The only buffer that can accept this sort of operation is a much more expensive first in-first out (FIFO) buffer. The preferred embodiment using three buffer memories per port is therefore cost effective.

The above discussion with reference to FIG. 4 also serves to define and illustrate the use of the letters A, B and C on the $T_X$ lines of the ports of FIG. 3. Each shaded square of a transmitting port represents the period $T_X$ required to output a block of data from a buffer. The letter just above the block identifies which buffer is being transmitted. The interrupts generated as the buffers A, B and C are filled are indicated by short vertical lines and identified by the letters A, B and C. Below the timing diagram of each source port is a timing diagram of its associated destination port. Note that at the time buffer A, B or C is being transmitted at one end, the data is being stored in the corresponding buffer A, B or C at the other end. A short vertical line below the destination port line shows when the indicated buffer of the destination port is read out. Note that the time required to read out a destination port buffer is equal to the time required to fill a source port buffer. This is because the clock rate of data into the source port is encoded and transmitted to the destination port for use in reading out the buffer memories of the destination port. In that manner the data rate at both ends in the same and is dependent solely on the source of the data, while the transmission rate for data from all sources over the laser beam link is the same, namely $F_{TX}$, where $F_{TX}$ is equal to the sum of $F_1$, $F_2$ ... $F_N$ of sources into ports $P_{1S}$, $P_{2S}$ ... $P_{NS}$ times an efficiency factor.

The technique for encoding the data clock rate of a source will now be described. Assume an input clock rate $F_n$ to a port. One input bit time is then $1/F_n = T_n$. Next assume a port buffer holds 2048 bits (A) of information. It is then filled every $AT_n$ seconds. Some method of generating an output clock at the receiver, identical with the input clock $F_n$, must be included with the information transmitted. If the input bit time ($T_n$) could be exactly encoded, it would be possible to reconstruct $T_n$ at the output, given the exact reverse process of encoding (decoding process).

There are only two pieces of timing information shared between the transmitter and receiver. One is the transmitter clock frequency ($F_{TX}$) which is replicated by a bit synchronizer in the receiver. The other is the time between data block transmissions, i.e., the time between interrupt acknowledgements (transmitter outputs or receiver inputs) of the source port. It may be shown from the previous discussion that the time between interrupt acknowledgements of a source port may vary in any one instance from close to zero to a maximum of close to $2AT_n$. However, the average time between these interrupt acknowledgements must be exactly equal to $AT_n$ since every $AT_n$ period generates an interrupt which must be acknowledged in a random distribution somewhere between its occurrence at time $T_o$ and the next interrupt at time $T_o + AT_n$. It is possible to include such an averaging means in the receiver port and this means would, over many input block cycles, yield the correct time ($AT_n$) to a very close approximation. This time, when divided by $A = 2048$ gives $T_n$ for the output clock to be generated to a high degree of accuracy. There is one advantage to this averaging method: the clock rate would not have to be encoded at the transmitter and sent to the receiver. There are, however, two distinct disadvantages. The first is that the averaging network takes many block transmissions cycles to establish an accurate time $AT_n$ before an accurate clock frequency $F_n$ can be synthesized. The data from these block transmission cycles would have to be stored until $F_n$ could be realized, and this would take a rather phenomenal amount of storage. The second disadvantage to this method is that the large amount of arithmetic means needed would be costly and would take up a great deal of space. Therefore it is preferable to encode the clock rate at the transmitter and to transmit the clock code with the data.

The most efficient method of encoding any digital information is in binary form because it uses the least possible number of bits to represent a given numerical value. The simplest method of generating a binary number equivalent to $AT_n$ is to count in a binary counter the transmitter clock $F_{TX}$ and sample this count (while resetting the counter to begin again) at every $AT_n$ time of the source port. Since $T_X = 1/F_{TX}$ is finite, an absolutely exact encoding of $AT_n$ is impossible during one count unless the time $AT_n$ just happens to be integrally divisible by $T_X$. There would therefore be some error that is a fraction of the time $T_X$ since $AT_n$ is completely uncorrelated with respect to $T_X$. That is, the count during any $AT_n$ time could deviate between $+T_X$ and $-T_X$ from the actual count needed to synthesize an exact replica of the time $AT_n$. However, if the count sampling process at $AT_n$ time were made synchronous with $T_X$, the counter would never be reset during a count period, i.e., if the first falling edge of a cycle in $F_{TX}$ occurring after $AT_n$ samples the count and the following rising edge presets the counter to a binary "1", no $F_{TX}$ counts would be lost and the succeeding samples during following $AT_n$ times would eventually average out the preceding error in the count sample. For example, assume a source port input frequency of 150 KHz ($T_n = 6.66$ $\mu$sec and $AT_n = 13653.333$ $\mu$sec). Assume further, a transmitter output frequency of 1.0 MHz ($T_X = 1.0$ $\mu$sec). The resulting counts at sequential $AT_n$ times would be: $AT_{n1} = 13653$; $AT_{n2} = 13653$; $AT_{n3} = 13554$. Averaging these times gives: $AT_n = 40960/3 = 13653.333$ which is an exact reproduction of the actual $AT_n$. Any errors (remainders of a sampled count) are cumulative and will introduce themselves into a future sampled count when their sum becomes greater than one $T_X$ time. In that manner, the average of counter samples would be exactly equal to $AT_n$.

In the case that $F_{TX}$ is a high frequency (say 1.0 MHz) and a lower priority port has a low frequency input (say 100 Hz) the $AT_n$ count would be enormous ($A/F_n \times F_{TX} = 20.48 \times 10^6$) and would take $2^{24}$ bits to represent. Since $F_{TX} = F_{RX}$, one could use $F_{TX}/2^n$ to count this port's $AT_n$ time and use an identical $F_{RX}/2^n$ to reconstruct the clock in the receiver port. This would reduce the $AT_n$ count for low frequency ports to a manageable figure.

Due to cost and space considerations, the $AT_n$ encoder counter in the transmitter port is limited to a 20-bit binary number of a maximum count of 1,048,575. At an $F_{TX}$ of 1 MHz, the lowest $F_n$ encoded with $F_{TX}$ ($T_X = 1$ $\mu$sec) would be $2048/1048.575 \times 10^3$ msec = 1.96 KHz. The frequency division for $F_{TX}$ is limited in the design to $F_{TX}/2^6$ or $F_{TX}/64$. At a $F_{TX} = 1.0$ MHz this would give a count frequency of 15.625 KHz ($T_X = 64$ $\mu$sec). The lowest frequency input ($F_n$) allowed in the system would then be $2048/1.048575 \times 64$ sec or 30.52 Hz. Of course, the lower the necessary $F_{TX}$ in the system, the lower the $F_n$ that can be accommodated. These are practical considerations only, and do nothing more than demonstrate that the clock rate encoding technique has a lower limit for a predetermined number of code bits. To extend the lower limit, it would be possible to adopt a large number of code bits, such as 24 instead of 20. The clock code generated in a source port by counting $F_{TX}$ between interrupts is included in the header information during the buffer data transmission from that port. A control unit in the receiver routes this count to the correct receiver port upon decoding the 7-bit port I.D. code contained in the header.

The receiving port accepts the 20-bit count and stores the most significant 8 bits in a register that feeds a count down circuit and the least significant 12 bits to another register feeding an arithmetic accumulator network. This affects a division of $AT_n$ by 2A or 4096. The 8-bit down counter is loaded from the first register and counted down to zero by $F_{RX}$, the identical frequency to the transmitter clock used to encode $AT_n$. The zero state of the down counter is sensed and the counter is reloaded with the eight most significant bits from the 20-bit count.

The zero decode pulses occur roughly once every $T_n/2$ time and are used to clock a flip-flop which divides the input frequency ($2F_n$) by two, generating a 50% duty cycle clock approximately equal to the $F_n$ of the source port. The remainder of the division of 4096, stored in the 12-bit register, is added to an accumulator register every time the down counter reaches zero. If this addition produces a carry out of the twelfth stage, this carry produces an addition of $2^0$ or 1 to the next 8-bit register load into the down counter for the next down count to zero. This means the output clock from the flip-flop will increase in time by one count clock pulse when the accumulator produces a carry.

This deviation in output $T_n$ time is $$\frac{T_{n\,max} - T_{n\,min}}{T_{n\,ave}} = \frac{T\,count}{T_{n\,ave}}$$

percent of the total $T_n$ time. It is obvious that for transmitter input frequencies less than $F_{TX}/4$, this output clock jitter will not be significant. The accumulated addition of the remainder of the division of $AT_n$ by 2A will produce an output clock whose average frequency will be identical with the source port $F_n$.

For clock frequencies greater than $F_{TX}/4$ the jitter of the output clock becomes significant. For a port with $F_n = F_{TX}/1.5$ (or $T_n = 1.5T_X$) the percent deviation would be $TX/1.5TX = 1/1.5 = 66.7\%$. In this instance, $F_{TX}$ could be produced by a divide-by-2 network fed by an oscillator whose frequency is $2F_X$. The oscillator frequency could be used to encode the $AT_n$ time of such a port. For $AT_n$ decoding in the receiver, the count clock $2F_{TX}$ is automatically produced in the bit synchronizer by virtue of the information encoding process for the output data stream. This process reduces the jitter as $T_{X/2}/1.5Tx = \frac{1}{3} = 33\%$. Similar procedures may be used in this instance to produce a count clock of $4T_X$ although the receiver bit sync would have to be changed to run twice its normal rate. Jitter is then $T_{X/4}/1.5T_X = 1/6 = 16.67\%$. If this figure is still too high, a phase lock loop could be added to the receiver port to produce $F_n$ with no significant jitter. However, in most cases, clock frequencies greater than one fourth the transmitter frequency $F_{TX}$ will not be encountered. In the rare instance where higher clock frequencies are encountered, one of these suggested techniques may be employed to reduce jitter. Assume the case where $F_n = F_{TX}/1.625$ or $T_n = 1.625\,T_X$. Further assume $F_{TX} = 1.0$ MHz. The $AT_n$ encoding process would use a clock equal to $4T_X = 4.0$ MHz or $T_{count} = .250$ $\mu$sec. The $AT_n$ count would be $$\frac{2048\,(1.625\,\mu sec)}{.250\,\mu sec} = 13312 \text{ or } 11010000000000.$$

Division by 4096 in the receiver would give the accumulator input = 010000000000 and the down counter input = 00000011. Normally the down counter would give a $T_n/2$ of $3 \times 0.250$ $\mu$sec = 0.750 $\mu$sec and the $T_n$ obtained from the divide-by-two flip-flop would be $0.750 \times 2 = 1.5$ $\mu$sec. When the accumulator produces a carry, the down counter gives a zero detect at $4 \times .250$ $\mu$sec = 1 sec and at the next zero detect would return to 0.750 $\mu$sec. $T_n$ would then be 1.75 $\mu$sec. Since the accumulator produces a carry every fourth zero detect, the average output bit time $T_n$ ave would equal $$\frac{1.5 \ \mu sec + 1.75 \ \mu sec}{2} = \frac{3.25 \ \mu sec}{2} = 1.625$$

μsec and the jitter would be 0.25 μsec (1.75 μsec − 1.5 μsec) or 0.25/1.625 = 15.38% of $T_n$ ave.

By virtue of the techniques described above, the system is able to accept and multiplex from 1 to 128 completely asynchronous data inputs and transmit this information over a serial data stream, as well as encoding an input data clock in the transmitter in such a fashion as to reconstruct this clock at the individual port outputs of the receiver. The only system limitations are the low input frequency limit produced by the clock encoding process and the limitation produced by the equation:

$$F_{TX} = \frac{1}{E} \sum_{n=1}^{128} F_n.$$

As $F_{TX}$ is currently limited by laser technology to 1.0 MHz, the high input frequency limit determined by this equation of 2.0 MHz is not relevant.

Figure 5:
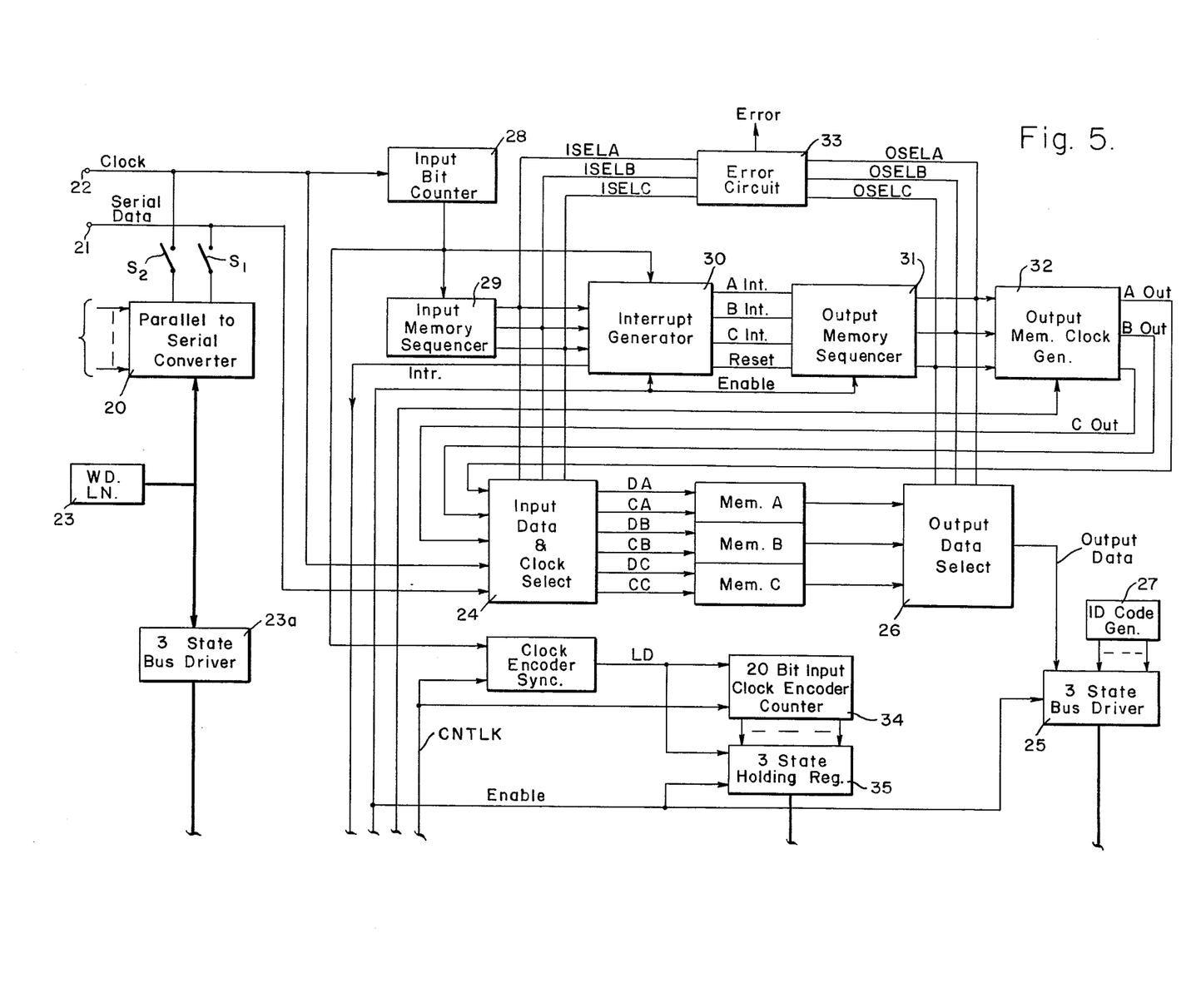
FIGS. 5 and 5a, taken together, is a block diagram of one of a plurality of source ports $P_{1S}$ to $P_{NS}$ in the system of FIG. 1, and a block diagram of the transmitter of the system.
Figure 5A:
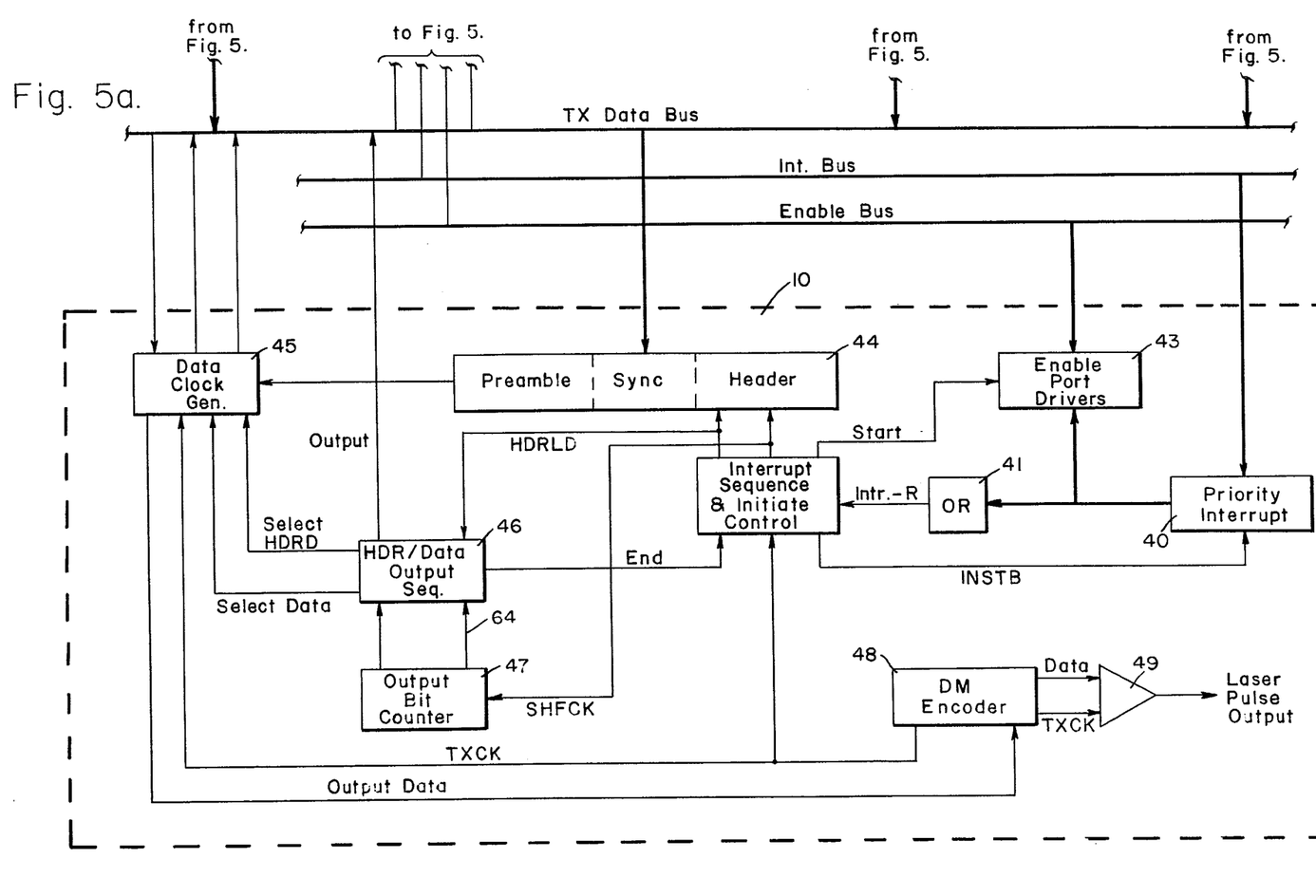

The organization and operation of a source port, such as the source port $P_{NS}$, and the transmitter 10 will now be described with reference to FIGS. 5 and 5a. Since all source ports are the same, only one need be described, and since each may have a parallel-to-serial data converter 20 at its input, such as for receiving data in parallel from an analog-to-digital converter, the source port shown in FIG. 5 is with that option. When the data to the port is already in serial form the converter is disconnected by switches $S_1$ and $S_2$, and the source data and data clock are connected directly to a data input terminal 21 and a data clock input terminal 22, respectively.

It is contemplated that for each source port, a universal converter will be provided capable of receiving and converting parallel words of up to 32 bits in length. The actual selection of a given converter would then be made at the time the port is dedicated to a data source. The selection is made at a word length (WD.LN.) code generator 23 which transmits a 6-bit code to the converter 20, and to the transmitter 10 via a bank of 3-state bus drivers 23a.

The source port includes three buffer memories labelled MEM. A, MEM. B and MEM. C. Each is capable of storing a block of 2048 bits of input data. One of these memories is selected to receive input data by an input data and clock select gating network 24, while another is selected to output data via a bank 25 of 3-state drivers by an output data select gating network 26. By providing three buffer memories, it is possible to fill one with data, generate an interrupt signal and proceed to store following data in the next buffer memory in sequence while the third one previously filled is selected to output data, as described hereinbefore with reference to FIG. 3. The bank 25 of drivers includes one driver for data transmitted serially and seven drivers for a 7-bit identification (I.D.) code from an ID code generator 27 preset to a unique code.

The input data clock at the input terminal 22 is applied to an input bit counter 28 which counts bits of input data. When a count of 2048 is reached, it outputs a signal "2048" and automatically recycles to count another block of 2048 bits. That signal steps an input memory sequencer 29 to the next memory which energizes one of three output terminals to activate the gates of the network 24 necessary to route the input data and clock to the next buffer memory.

The "2048" signal is also applied to an interrupt generator 30 to set an interrupt signal time for the memory just filled and to transmit an interrupt signal to the transmitter. For example, if the memory C has just been filled, an interrupt signal CINT is set true as the input memory sequencer 29 steps to the memory A select state. There will only be one interrupt signal AINT, BINT or CINT generated at any time. A general interrupt signal INTR is also generated, as by an OR-gate connected to receive the AINT, BINT or CINT. That general interrupt signal is sent to the transmitter. Before the next memory, A, is filled to generate an interrupt signal AINT, a priority interrupt system in the control section of the transmitter will respond to the general interrupt signal to enable the memory C via an output memory sequencer 31 to be transmitted. That signal will reset the interrupt signal CINT, and therefore also reset the general interrupt signal sent over a separate one of N wires to the transmitter.

The interrupt signals AINT, BINT and CINT are applied to the output memory sequencer 31 to properly sequence the memories on a first-in, first-out basis according to the following logic functions:

OSELA = A INT·$\overline{\text{CINT}}$·ENABLE
OSELB = B INT·$\overline{\text{AINT}}$·ENABLE
OSELC = C INT·$\overline{\text{BINT}}$·ENABLE The output signals of the output memory sequencer gate an output clock that is synchronized with the transmitter clock TXCK as a clock to one of the memories according to the following logic functions of an output memory clock generator 32

AOUT = OSELA·OUTPUT·TXCK
BOUT = OSELB·OUTPUT·TXCK
COUT OSELC·OUTPUT·TXCK OSELC.OUTPUT.TXCK

The signal output is generated by the transmitter and sent to the source ports via one wire in the data bus. The input data and clock select network 24 route the gated clock AOUT, BOUT or COUT to the memory A, B or C through OR gates according to the following logic functions CA = AOUT+ISELA·INPUT CLOCK
CB = BOUT+ISELB·INPUT CLOCK
CC = COUT+ISELC·INPUT CLOCK Thus, while one memory is being selected to store input data at a relatively slow rate of the input clock from the source, another memory is selected to output data at the higher rate of the transmitter. The network 24 routes the input data to the proper memory, and the network 26 routes the output data from the proper memory to one of the bus drivers 25.

While one memory is being selected for output of data by the signals OSELA, OSELB, aand OSELC, another is being selected for input of data by the signals ISELA, ISELB and ISELC. To assure that the same memory is not being selected for both input and output, an error circuit 33 determines when there is such an error according to the following function:

ERROR =
OSELA·ISELA+OSELB·ISELB+OSELC·ISELC

This error signal may be employed to turn on an error light at the transmitter and/or it may be transmitted to the source connected to the port to indicate to that source that an error in transmission has occurred, in which case the source may elect to retransmit the entire message consisting of a sequence of blocks of data.

A 20-bit clock input clock encoder-counter 34 is employed to encode the input clock frequency as a count $AT_n$ of transmitter clock pulses TXCK between interrupt signals for $A = 2048$ in this exemplary embodiment. Since the frequency $F_{TX}$ of the transmitter clock is very high as compared to the input data clock frequency $F_n$, e.g., $F_{TX} = 1.0$ MHz and $F_n = 100$ Hz, the count of TXCK over a period $AT_n$ would be enormous, namely $AT_nF_{TX} = 20.48 \times 10^6$, which would require 24 bits. Since the counter 34 has only 20 bits, it is necessary to reduce this count by dividing $F_{TX}$ by $2^n$, where $n$ is an arbitrary integer selected at the transmitter to produce a count clock CNTCLK $= F_{TX} \div 2^n$ that is applied to the counter 34. Each time the input bit counter 28 has counted a block of $A = 2048$ bits, the content of the counter 34 is loaded into a 3-state holding register 35, and at the same time the counter 34 is reset to zero, all in response to a "2048" signal synchronized with the clock CNTCLK by a clock encoder synchronizer 36. The holding register retains the count, encoded clock rate, until an enable signal is received from the transmitter, whereupon the 20-bit code is transmitted in parallel over the data bus, along with the 6-bit word length code, 7-bit port ID code to make up 33 bits of a 64 bit header. The other 31 bits constitute hard-wired preamble (24) bits and sync code (7) bits.

The 33-bit header information transferred in parallel to the transmitter 10 requires only 33 wires of the data bus. The other four wires are dedicated to serial output data from the select network 26 via one of the drivers 25, and the input of CNTCLK and OUTPUT to the port from the transmitter, and the transmitter clock TXCK applied to the output memory clock generator.

The transmitter 10 receives interrupt signals from each of the various source ports via separate wires in the interrupt cable (INTR) having N wires, one wire for each port. These wires are connected to N input terminals of a bank 40 of priority interrupt registers which latch the interrupt signals received and provide full priority output gating. The function of the priority interrupt is to store interrupt signals from ports 1 through N in latches 1 through N, and to gate outputs from the latches, one at a time with an order of priority starting with the first latch, such that the Nth latch provides a gated output only after all other latches having been gated out. An OR gate 41 couples an interrupt response signal INTR-R from whichever interrupt latch is being gated out to an interrupt sequence and initialize control unit 42. When the end of a block of data being transmitted is reached, a signal END enables the control unit 42 to start transmission of a block of data from the interrupting port of next highest priority. The transmitted clock TXCK synchronizes the control unit. That is accomplished by the control unit transmitting: a signal START to enable a bank 43 of port drivers to transmit from one driver a signal ENABLE to the port that is not to be serviced via one of N wires in the TX ENABLE bus; a header load signal HDRLD and a shift clock SHFCK; and a signal INSTB which steps the interrupt registers to he next higher priority.

The header load signal causes a 64-bit shift register 44 to be loaded with the clock code (20 bits), port I.D. (7 bits) and word length (6 bits) from the port enabled, and a sync code (7 bits) and preamble code (24 bits) from hard-wired pins in the transmitter. This occurs after a delay of seven TXCK clock pulses to allow time for the enable signal to activate the source port. The next (eighth) clock pulse loads the shift register and sets a latch to gate out a series of 2048 pulses as a shift clock SHFCK to the register 44, thereby shifting out the preamble, sync code, word length code, ID code and clock code as header data, HDRD, to a data and clock generator 45 which generates to count clock CNTCLK, and output clock transmitted to the source port and selects the header data for transmission first and then the serial data from the source port for transmission as output data, all synchronized by the transmission clock TXCK. The signal which first selects the header data is generated by an output sequencer 46 which generates a signal SELECT HDRD until 64 shift clock pulses applied to the register 44 have been counted by an output bit counter 47, and then generates a SELECT DATA signal and the OUTPUT signal 2048 shift clock pulses have been counted.

It should be noted that once 64 shift clock pulses have been applied to the register 44 to transmit the header and then begin to output data under control of the OUTPUT signal and the SELECT DATA signal, that register is cleared and its output is no longer selected by the data and clock generator. Consequently, in practice the shift register is disabled while the signal SELECT DATA is present, such as by gating off the pulses SHFCK to the register. That will avoid unnecessarily operating the shift register.

The output data from the data and clock generator is in the same form read out of the memory A, B or C of the source port selected for data, bit synchronized with the transmitter clock TXCK. Typically, this form will be the NRZ code as shown in FIG. 2. A delay modulation encoder 48 converts the NRZ code to a DM code, and derives from the DM code a transmission (TR) code for triggering a laser transmitter 49 which transmits a laser pulse on a leading edge of each TR code pulse.

A photodetector and amplifier 50 (FIG. 6) at the input of the receiver 11 produces a replica of the TR code. That replica is applied to a DM decoder and clock generator 51 which reconstructs the NRZ code for the receiver data, RX DATA, and in the process derives a data clock RXCK at the same frequency as the transmitter clock TXCK. That is all just the inverse of the process carried out at the transmitter. The balance of the receiver provides a function that is also generally the inverse of the transmitter function. After processing the preamble and sync codes to verify that a block of data is being received, and to acquire bit sync with the data being received, the word length code, I.D. code and clock code are received and stored in a holding register 52. The ID code is decoded by a decoder 53. The word length code transmitted over the data bus to the serial-to-parallel converters 54, if put into use by switches $S_3$ and $S_4$, is connected to the destination ports, while the clock code is transmitted over the data bus to a 20-bit decoder and output clock timer 55 via a bank of output drivers 56.

Figure 6:
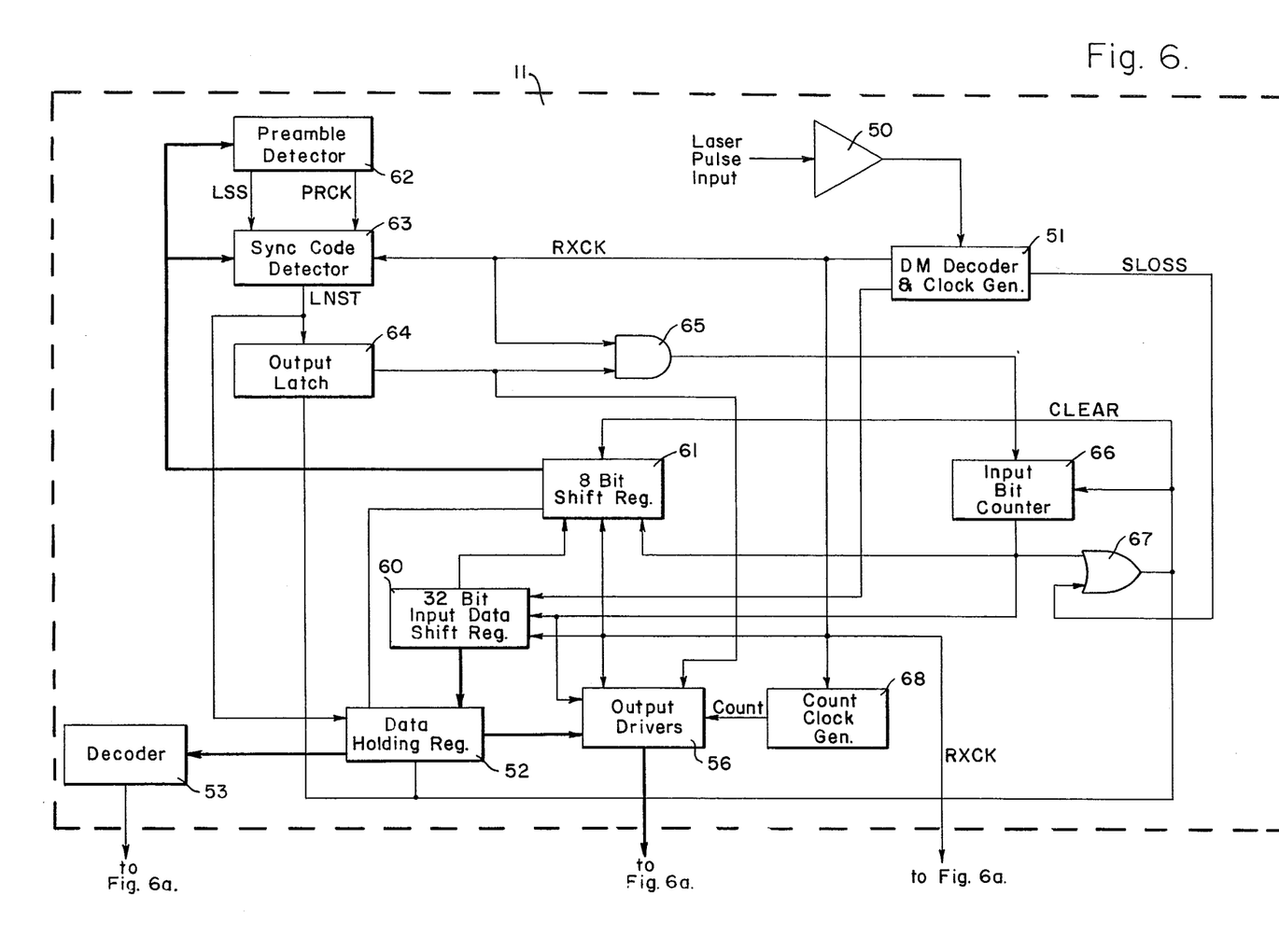
FIGS. 6 and 6a, taken together, is a block diagram of one of a plurality of distinction ports $P_{1D}$ to $P_{ND}$ in the system of FIG. 1, and a block diagram of the receiver of the system.
Figure 6A:
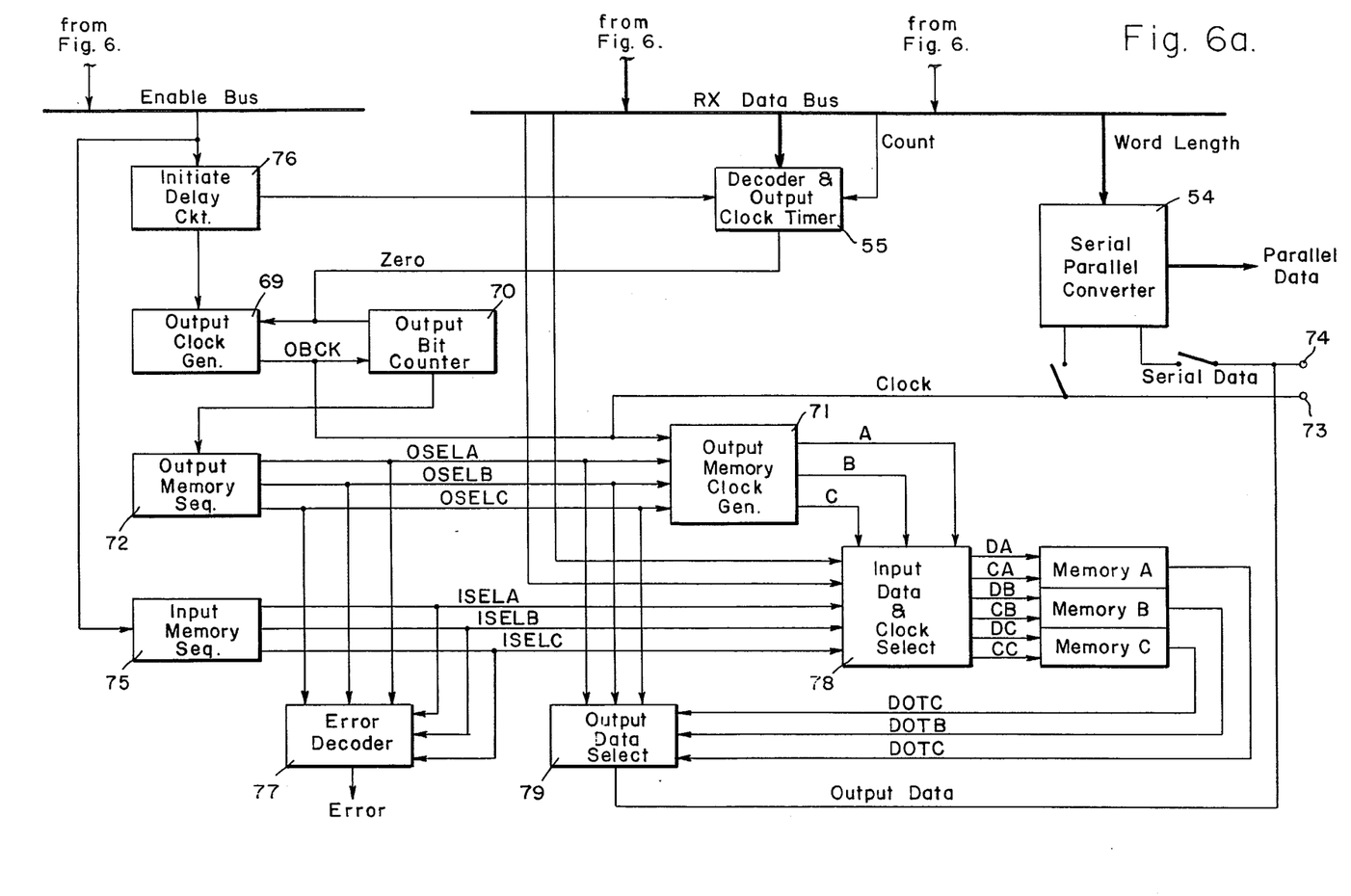

The receiver 11 will now be described in more detail with reference to FIGS. 6 and 6a. The received data, RX DATA, and receiver clock, RXCK, shift the serial train of input data through a 32-bit input data shift register 60 and from there into an 8-bit shift register 61. The outputs of the latter are applied in parallel to a preamble detector 62 and a sync code detector 63. Both the form and use of the preamble and sync codes are conventional. Until the preamble (24 bit) code is successfully received and decoded, the sync code detector is not operative. Once it is operative in response to a line start signal LSS and a preamble clock PRCK, it detects the sync code and generates a line start signal LNST which causes the next 33 bits of input data to be stored in the data holding register, one bit DA33 from the 8-bit register 61 and 32 bits DA1-DA32 from the input data shift register 60.

The signal LNST also sets an output latch 64 to produce an output control signal, OUT, for the next 2048 bits of data. That signal enables an AND gate 65 to transmit receiver clock pulses to an input bit counter 66 which detects when the last of 2048 bits of data has been received. At that time a "2048" signal transmits a signal CLEAR through an OR gate 67 to reset the receiver for the next block of data. The DM decoder and clock generator is provided with a time-out circuit. Each receiver clock pulse generated restarts the time-out circuit. If the signal is lost momentarily, for whatever reason, and data pulses are not received to produce receiver data and clock pulses, the time-out circuit will time out and cause a signal SLOSS to be generated indicating that the signal has been lost. The signal SLOSS will also transmit a clear signal through the OR gate 67 to reset the receiver for the next block of data since the balance of the current block of data is not valid.

It should be recalled that the transmitter clock TXCK was divided by $2^n$ to produce a count clock CNTCLK at a lower frequency to count the source port's $AT_n$ time as a way of encoding the source clock rate. Consequently, the receiver clock RXCK, which is equal to TXCK, is also divided by $2^n$ by a count clock generator 68, where $n$ is selected to be equal to n in the data and clock generator 45 of the transmitter. The output of the count clock generator labeled COUNT is transmitted to the output clock timer 55 which receives the 20-bit clock code to generate from that periodic timing signals that trigger an output clock generator 69. The output of that clock generator is applied to an output bit counter 70, and to an output memory clock generator 71 to generate a train of clock pulses AOUT, BOUT or COUT according to which output memory OMEM A, OMEM B or OMEM C has been selected by an output memory sequencer 72. The output of the clock generator 69 is also routed through the output memory clock generator 71 to a clock output terminal 73 for synchronization of output data on terminal 74 either in a serial-to-parallel converter as shown and/or in the data utilization device (not shown).

The operation of the destination port described with reference to port $P_{ND}$ shown in FIG. 6a assumes that the ID code of that port has been decoded by the decoder 53 which generates an enable signal EN transmitted over one of N wires in the receiver enable bus. That signal triggers an input memory sequencer 75 to select the memories in sequence. That signal also triggers an initial delay circuit 76 which in turn enables the 20-bit code decoder and output clock timer 55 and clock generator 69 after the initiation of the second 2048 bit input to the port. This delay is necessary to provide a buffer of 2048 bits in the case that the regenerated $F_n$ may initially be somewhat faster than the transmitter $F_n$ and to allow that the second interrupt from the transmitter port may not be answered until the third transmitter buffer is almost filled. It is thus evident that output of data is not synchronized with the input of data since the latter occurs at the high rate of RXCK, while the output of data occurs at a slower rate determined by the 20-bit code decoder and output clock timer 55.

The outputs of the output memory sequencer 72 and the input memory sequencer 75 are compared by an error circuit 77 to determine that the same memory is not selected for both input from the laser link and output to a data utilization device. Any error in that regard produces an error signal to the utilization device to indicate an error. However, such an error is very improbable for the reasons set forth. As is evident from the discussion with reference to FIG. 3, if both memory sequencers are initially set to the same memory, such as memory A, the input memory sequencer skips to the next memory once that memory is filled and begins its input to the next memory before the initial delay circuit 76 permits the data to be read out from memory A. In that manner the next memory in sequence may store data received over the laser link. An input data and clock select circuit 78 operates to steer the data and clock RXCK to the memory being filled while the output memory clock generator and the input data and clock select circuit gate the output clock to the memory to be read out. The memory being read out is gated by an output data select network 79 to the data output terminal 74 in response to the output memory sequencer 72.

Although particular embodiments of the invention have been described and illustrated herein, it is recognized that modifications and equivalents may readily occur to those skilled in the art and consequently it is intended that the claims be interpreted to cover such modifications and equivalents.

I claim:

1. An asynchronous multiplexer for pulse-coded data transmission over a single communication link from a transmitter having a priority interrupt system for servicing a plurality of source ports, one source port for each of a plurality of data sources operating independently of each other, each at a data clock rate $F_n$ sufficiently low as compared to a clock rate $F_{TX}$ of transmission by said transmitter that their sum does not exceed $EF_{TX}$, where E is an efficiency factor, each source port including at least three input buffer memories to be used in rotation for accumulating successive blocks of data bits to be transmitted, means for generating a priority interrupt signal transmitted to said priority interrupt system of said transmitter each time an input buffer memory is filled with a block of data to be transmitted, and means responsive to said interrupt system of said transmitter for selecting said input buffer memories as filled in rotation for transmission over said link at said clock rate $F_{TX}$, one input buffer memory selected for each priority interrupt response to an interrupt signal.

2. An asynchronous multiplexer as defined in claim 1 including means for transmitting a header with each block of data from each source port, said header including a source identification number and a source data clock rate code and including an asynchronous demultiplexer connected to receive transmitted data over said communication link, said demultiplexer comprising a receiver and a plurality of destination ports, one destination port associated with each source port, said receiver comprising means for decoding said identification code and means responsive to said decoding means for routing to the associated destination port the source data clocck rate code and data, each destination port comprising a plurality of output buffer memories for receiving in rotation successive blocks of data at a receiver clock rate equal to said transmission clock rate $F_{TX}$, means responsive to said data clock rate code for generating output clock pulses at a rate equal to said data clock rate, $F_n$, and means responsive to said output clock pulses and said identification code decoding means for reading out a block of data from a previously filled output buffer memory each time a received block of data is routed to an output buffer memory.

3. An asynchronous multiplexer as defined in claim 2 wherein said means in each source port for generating said data clock rate code includes means for counting clock pulses having a predetermined frequency relative to said clock rate $F_{TX}$ for a period from a previous interrupt signal to the interrupt signal generated in response to a block of data stored in a buffer memory of the source port.

4. An asynchronous multiplexer as defined in claim 3 wherein said frequency is related to said clock rate $F_{TX}$ by a factor that is a predetermined whole number.

5. An asynchronous multiplexer as defined in claim 4 wherein said means for generating output clock pulses at a rate equal to said data clock rate, $F_n$, in each destination port includes means responsive to said data clock rate code for generating said output clock pulses by repeatedly counting down a number equal to said code divided by a predetermined whole number.

6. An asynchronous multiplexer as defined in claim 5 wherein divisions in said means for generating said output clock pulses are effected by providing a down counter having a number of digit stages less than the number of digits in said data clock rate code for repeatedly entering only the most significant digits of said code for count down.

7. An asynchronous multiplexer as defined in claim 6 wherein digits of said code not entered into said down counter are added to the content of an accumulator each time said down counter is loaded, and means responsive to any carry from said accumulator for adding said carry to said code entered into said down counter.

8. An asynchronous multiplexer-demultiplexer for pulse-coded data transmission from a plurality of source ports to a corresponding number of destination ports over a single communication link from a transmitter to a receiver at a predetermined transmitter clock pulse rate sufficiently high to accommodate all of the source ports and corresponding destination ports, each source port comprising a plurality of buffer memories for accumulation of data blocks to be transmitted, means for encoding the data source clock rate into a multi-bit code word, means for generating an interrupt signal to the transmitter, priority interrupt means responsive to the interrupt signals from all of the source ports as they occur for controlling the transmitter to transmit blocks of data from the source ports on a predetermined order of priority giving sources of higher data rate higher priority, means for including in each block of data transmitted a header which includes a multi-bit code word and a source port identification code, means in the receiver for decoding the identification code in each block of data to enable the header of the block of data to be routed to a destination port, means in each destination port for storing a block of data routed to the destination port in one of a plurality of buffer memories in rotation, means in each destination port for decoding the multi-bit code word in the block of data routed to the destination port and producing output clock pulses at a rate for reading out data from one of the buffer memories of the destination port, and means for selecting buffer memories to be read out one at a time on a first in, first out basis.

9. An asynchronous multiplexer-demultiplexer as defined in claim 8 wherein said means for encoding the data clock rate into a multi-bit word in each source port includes means for counting clock pulses having a predetermined frequency relative to the transmitter clock pulse rate for a period from a previous interrupt signal to the interrupt signal generated in response to a block of data stored in a buffer memory of the source port.

10. An asynchronous multiplexer-demultiplexer as defined in claim 9 wherein said means in each destination port for decoding the multi-bit code word includes means responsive to said multi-bit code word for generating said output clock pulses by repeatedly counting down a number equal to said code word divided by a predetermined whole number.

* * * * *